United States Patent [19]

Otake

[11] 4,417,148

[45] Nov. 22, 1983

[54] PHOTODETECTOR DEVICE FOR DETECTING THE FRONT AND REAR ENDS OF A MOVING SHEET

[75] Inventor: Eiji Otake, Kawaguchi, Japan

[73] Assignee: Konishiroku Photo Industry Co., Ltd., Tokyo, Japan

[21] Appl. No.: 401,409

[22] Filed: Jul. 23, 1982

Related U.S. Application Data

[63] Continuation-in-part of Ser. No. 122,714, Feb. 19, 1980, abandoned.

[30] Foreign Application Priority Data

Feb. 22, 1979 [JP] Japan .................................. 54-19008

[51] Int. Cl.³ ........................................... G01N 21/86
[52] U.S. Cl. ............................... 250/561; 250/223 R; 250/214 B
[58] Field of Search .................... 250/560, 561, 214 B, 250/214 C, 214 RC, 206, 223 R; 356/386, 387; 226/45

[56] References Cited

U.S. PATENT DOCUMENTS

| | | | |
|---|---|---|---|
| 3,400,270 | 9/1968 | Durig | 250/214 RC |
| 3,660,670 | 5/1972 | Howard | 250/561 |
| 3,812,372 | 5/1974 | Wirtz et al. | 250/214 RC |
| 4,047,023 | 9/1977 | Key et al. | 250/214 B |
| 4,120,403 | 10/1978 | Stephanos | 250/560 |

Primary Examiner—David C. Nelms
Attorney, Agent, or Firm—James E. Nilles

[57] ABSTRACT

A photodetector device for photoelectrically detecting the presence of a moving body, comprising an operational amplifier receiving as a first input an electric signal which is in proportion to variations in the quantity of light, and a delay circuit for delaying the electric signal by a predetermined period of time and applying the electric signal to the operational amplifier as a reference input with respect to the first input. The information of the presence of a moving body is obtained as an output from the operational amplifier.

6 Claims, 14 Drawing Figures

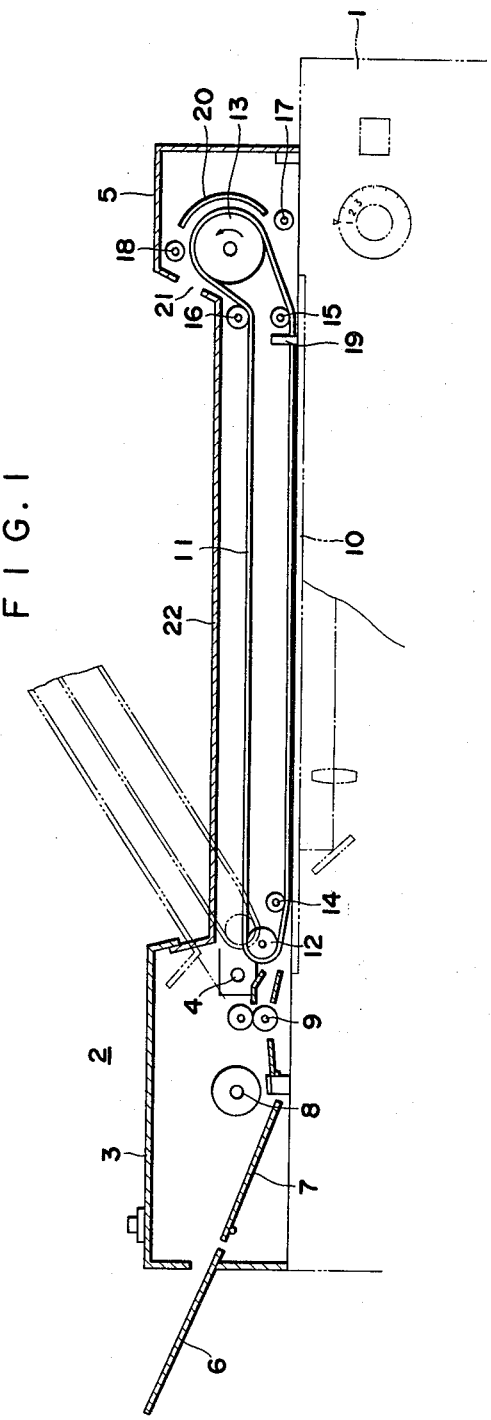
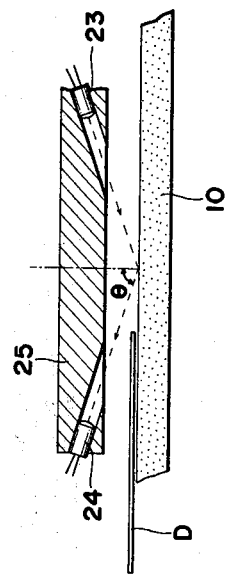
FIG. 1
FIG. 2

PHOTODETECTOR DEVICE FOR DETECTING THE FRONT AND REAR ENDS OF A MOVING SHEET

REFERENCE TO RELATED CO-PENDING APPLICATION

This application is a continuation-in-part application from application Ser. No. 122,714 filed Feb. 19, 1980, now abandoned and entitled: PHOTODETECTOR DEVICE FOR DETECTING MOVING SHEET.

BACKGROUND OF THE INVENTION

1. Field of the Invention

The present invention relates to a photodetector device for detecting the presence of a moving body such as sheet or the length of a moving sheet with respect to the direction in which the moving sheet is moved, by means of an output, based on variations in the quantity of light, from a photoelectric means provided in the vicinity of a path of a moving sheet and, more particularly, to a photodetector device suitably used for detecting a moving sheet, especially, a moving original in an automatic original feed unit in a copying machine, from an output based on variations in the quantity of light and varying greatly due to external factors.

2. Description of the Prior Art

An automatic original feed unit is capable or automatically feeding an original to be copied, through an operation of a copying button. In this automatic original feeding operation, originals stacked on a supplying tray are automatically transferred one by one to a copying position or onto a copy board, and originals which have been copied are automatically discharged onto a collecting tray.

Although FIG. 1 is a schematic illustration of an automatic original feed unit according to the present invention, for the convenience of description of the construction or arrangement relation to the unit it is used as a conventional automatic original feed unit. Referring to FIG. 1, a copying machine body 1 is provided with an automatic original feed unit 2 which is integrally formed with a copy board 10 thereof. This original feed unit 2 consists of a main body 3, and a movable body 5 pivotally supported on a shaft 4 in the main body 3 such that the movable body 5 can be moved in the vertical direction on the copy board. The main body 3 is provided with an original feed table 7 onto which one or a plurality of originals are inserted from a chute 6 a feeding roller 8 driven by an original feeding instruction to feed an original from the feed table 7, and a carrying roller 9 driven in the same manner at the same peripheral speed as the feeding roller 8 to transfer the original towards the side of the movable body 5.

A supplying tray mentioned above is same meaning with a unit consisting of the chute 6 and the original feed table 7. Therefore, the unit is called as supplying device, sometimes.

The movable body 5 is provided with a transfer device consisting of a conveyor belt 11, pulleys 12, 13, idlers 14, 15, 16, a guide roller 17 and a discharge roller 18, so as to transfer an original which has been fed from the carrying roller 9 and which is placed on the copy board made of glass to a proper position, and discharge the original on the copy board 10 at the completion of a copying operation therefor.

The pulley 12 (or 13) is driven by a motor (not shown) directly or via an electromagnetic clutch when an original is fed or when an original is discharged.

The movable body 5 is provided in addition to the above-mentioned members with a stopper 19 which is projected on the surface of and at the front side of the copy board 10 by a plunger action so as to stop the original to a proper position during the transfer thereof.

Reference numeral 20 denotes a guide member adapted to guide the original from the guide roller 17 to the discharge roller 18 during an original discharging operation, 21 a discharge port, and 22 a collecting tray serving also as a cover for the movable body 5.

In an automatic original feed unit described above, it is necessary to stop an original fed from an original supplying tray, when the original has been transferred to a proper position (the stopper 19) on the glass forming a copy board 10, namely, to stop the movement of the conveyor belt 11 in accordance with the copying operation. When the conveyor belt 11 is not stopped accurately, originals may be jammed at the position providing the stopper 19 or originals may not be stopped in a proper copying position. Therefore, it is to be desired that the movement of the conveyor belt 11 be controlled, properly, in consideration of the inertia force of the transfer device based on the motor mentioned above.

In order to properly stop the original, it is necessary to provide a sensor or detecting means for sensing the arrival of the original at a predetermined position.

Methods conceivable of stopping the original in a proper position include a one employing a sensor disposed immediately before the stopper 19 to stop the original in which the motor for transfer device is sheet off of the operation at a moment when the front end or edge of the original is sensed by the sensor, and a one employing a sensor disposed in the space in the path of original which is between the carrying roller 9 and the conveyor belt to determine the original stopping point on the basis of time defined by a distance between the point at which the sensor is disposed and the given original stopping position and the transfer speed of the original.

In the latter method, a sensor of a simple construction may be used, which consists of a light receiving element and a luminescent element disposed on both sides of the path of the original. However, this method is very unstable, namely, originals often slip on the conveyor belt and the transfer speed of originals tends to fluctuate. Consequently, it is difficult to stop the original at a high accuracy by this method.

On the other hand, the former method easily attains a high accuracy of detecting and stopping the original. The sensor employed in this method is placed on the copy board 10, in general, in a copying machine. Therefore, if the above-mentioned light-permeating sensor is utilized in this method, it becomes necessary to dispose, for example, a light receiving element within the copying machine body and a luminescent element on the side of the automatic original feed unit so as to set opposite to each other. This causes a restriction on the designing of the automatic original feed unit. Namely, it is very inconvenient to separately form an automatic original feed unit such that the feed unit can be detachably set in a copying machine.

Therefore, a method employing a reflector type sensor as schematically shown in FIG. 2 is preferably used, in which a sensor consists of a luminescent element 23 and a light receiving element 24 is set in a holder 25 and disposed on the side of the automatic original feed unit. In other words, the two elements are disposed on the same side to the passage of the moving body. In this method, an optical output from the luminescent element 23 is reflected on the glass forming a copy board 10, so as to be guided to the light receiving element 24.

However, since this reflector type sensor utilizes the light reflected on the glass constituting a copy board or the light reflected on the original, it has a low utilization rate of light, a low level of output from the light receiving element, a large temperature drift in the output from the light receiving element due to the radiation of heat from an exposure lamp for exposing the original to be copied a considerable variations in reflection factor due to stains on the glass constituting a copy board, a considerable distribution in the sensitivity of the light receiving element itself, and a slight slippage in the optical axes. Accordingly, the detection accuracy of the above sensor is extremely low.

Such problems due to the environmental factors are also raised in a case where a light-permeating sensor is used in an atmosphere having various kinds of external disturbances, for example, an environment which has influence on the irradiation of light on the path of originals.

SUMMARY OF THE INVENTION

In view of the above-described problems, an object of this invention aims at providing a photodetector device which permits accurately detecting the presence of a moving sheet from an electric signal converted from variations in the quantity of light, without using a complicated drift compensation circuit.

The above object will be clearly understood from a photodetector device according to the present invention characterized by means for detecting the presence of a moving sheet from variations in level of an electric signal converted from variations in the quantity of light.

The term "variations in level" used above means variations higher than a predetermined level in an electric signal, which occur in a predetermined period of time.

BRIEF DESCRIPTION OF THE DRAWINGS

FIG. 1 is a schematic illustration of an automatic original feed unit;

FIG. 2 is a side elevational view in cross section of a light reflecting sensor for detecting a moving sheet according to the present invention;

DETAILED DESCRIPTION OF THE PREFERRED EMBODIMENT

Figure 3:
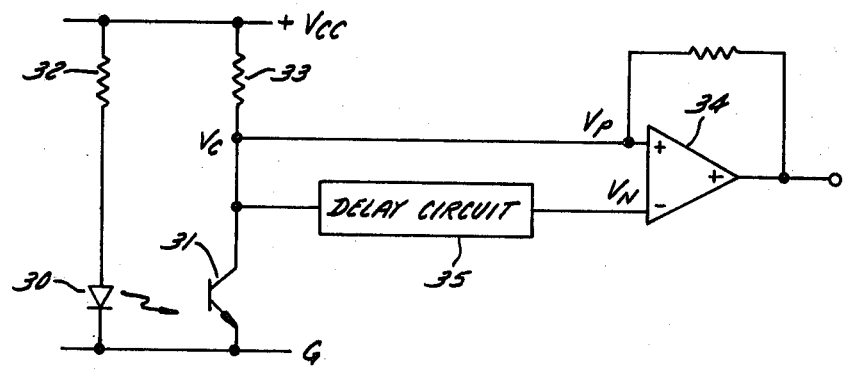
FIG. 3 is a circuit diagram of a photodetector device embodying the present invention.

FIG. 3 shows a principle thinking according to the present invention. In this embodiment, a luminescent diode 30 serving as a luminescent element and a phototransistor 31 serving as light receiving element are provided at a predetermined angle within a holder 25 as shown in FIG. 2, and the optical axes of the diode and transistor are set such that the optical axes meet with each other on that surface of a glass constituting a copy board 10, on which an original is transferred.

In this embodiment, the holder 25 is mounted on a plate (not shown) provided behind the belt of lower side, which plate is movable together with the movable body.

The angle $\theta$ of inclination of the luminescent element 23 and the light receiving element 24 has a great influence on the reflection factor of light. When the angle of incidence exceeds 60°, It has been found that the reflection factor suddenly increases, when the angle of incidence exceeds 60°, in many experiments by inventor. However, when the angle $\theta$ is increased, it is necessary to increase the dimensions of the sensor holder 25 as well. Accordingly, an incident angle of approximately 75° is employed taking into consideration the angle of inclination of the luminescent element and the dimensions of the sensor holder in this embodiment.

A predetermined voltage is applied to the luminescent diode 30 (luminescent element) through a resistor 32. Power source of the photo-diode is the same to that of the photo-transistor in an embodiment, but it may be used separate power source, respectively. The phototransistor 31 is provided with a load resistance 33 so as to obtain variations in the quantity of reflected light in the form of an electric voltage signal. The resistance 33 may be provided at the emitter-side of the transistor 31 so as to obtain a voltage signal making use of the earth as a reference potential.

An output voltage of the load resistance 33 or a voltage in proportion to the above-mentioned output voltage is applied to an operational amplifier 34 as a non-inversion input thereto.

A delay circuit 35, which receives as its input an output from the load resistance 33, is used to delay the voltage signal by a predetermined period of time and apply the voltage signal to the operational amplifier 34 as an inversion input. The level ratio of an inversion input of the operational amplifier 34 in a normal condition is set to a non-inversion input thereof and a level differential of higher than the resolution ability of the amplifier 34 if given.

Figure 4:
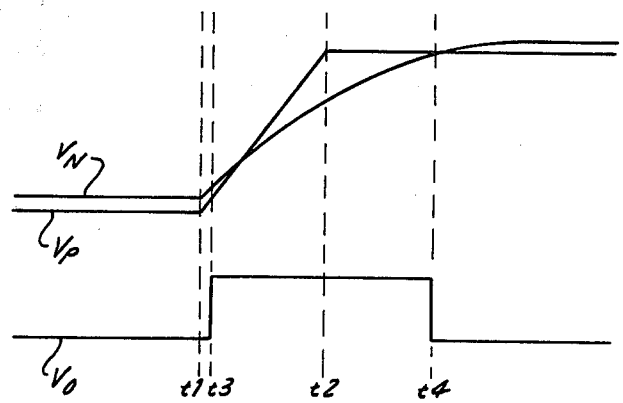
FIG. 4 is a wave form diagram describing an action of the embodiment shown in FIG. 3.

In the above-described onstruction, an inversion input $V_p$ of the operational amplifier 34 is set to a level lower than a non-inversion input $V_N$ thereof as shown in FIG. 4.

When the light reflection factor of the glass forming copy board 10 is higher than that of an original and, assuming that a voltage $V_C$ of the load resistance 33 is increased at the time of arrival of the original, the voltage $V_C$ starts increasing when the front end of the original reaches a position ($t_1$ as shown in FIG. 4) where the original influences the quantity of light received by the transistor 31, and the voltage $V_C$ substantially retains a high level when the original reaches a position $t_2$ (in FIG. 4) where the transistor 31 receives only the reflected light from the original. An output $V_N$ from the delay circuit 35 is delayed by time T with respect to the voltage $V_C(=V_p)$. Accordingly, an output $V_O$ from the operational amplifier 34 is inversed at time $t_3$ and returned at time $t_4$ so that a rising part at time $t_3$ or a falling part at time $t_4$ can be utilized for a timing signal for detecting the front end of the original. Let $t_0$ equal to time at which the front end of the original reaches the stopper 19. A time differential $(t_0-t_3)$ or $(t_0-t_4)$ can be corrected easily at a high accuracy from the feed rate or speed of the original.

Figure 5:
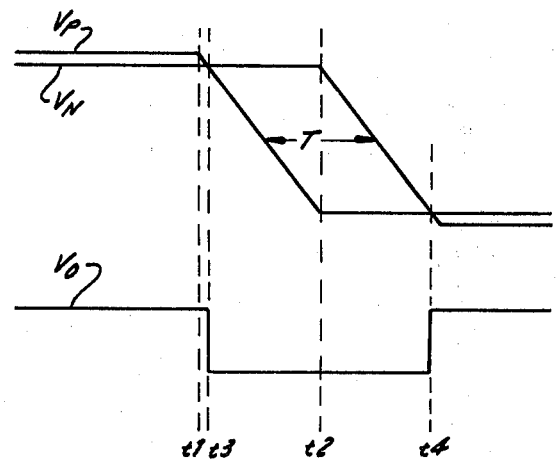
FIG. 5 is another wave form diagram describing an action of the embodiment shown in FIG. 3.

In order to detect the rear end of an original, the relation with respect to the level of voltage mentioned above between $V_p$ and $V_N$ in a circuit shown in FIG. 3 may be merely reversed as shown in FIG. 5. The detection of the rear end of an original may also be effected by putting the delay circuit 35 in a circuit shown in FIG. 3 on the $V_p$ side. In this case, the output $V_O$ of the operational amplifier is converted the phase as compared with the case in which the front edge of the moving body is detected.

When the levels of $V_p$ and $V_N$ are interchanged, while the original passes a turning point of optical axes, such that one is higher than the other and vice versa, the front and rear ends of the original can be detected by the same circuit. The length of the original with respect to the direction in which the original is transferred can also be detected from a time differential between the detected signals representative of the front and rear ends of the original and the feed rate thereof. The feed rate of the original can also be detected from the pulse widths of the detected signals representative of the front and rear ends of the original. The reason why the above can be achieved by a detector device according to the present invention resides in that the light receiving surface of the light receiving element has a certain amount of area and that the pulse width ($t_3-t_4$ shown in FIG. 4) of an output from the operational amplifier 34 varies depending upon the angle of inclination of $V_C$, which varies gradually, not in a stepped manner, as mentioned above, during the detection of the original, i.e. depending upon the feed rate of the original.

Attention should now be paid to the fact that the presence of an original is detected from variation in the voltage $V_C$ and even when $V_p(V_C)$ in the wave form shown in FIG. 4 varies gently due to a temperature drift of a photo-transistor, the inversion of levels of $V_p$ and $V_N$ does not occur. Consequently, the compensation of drift can be carried out without providing a complicated drift compensation circuit in an optical detection system consisting of a luminescent element and a light receiving element. Since the levels of $V_p$ and $V_N$ are compared with each other by an operational amplifier, a detector device according to the present invention has excellent in-phase signal removing (CMR) characteristics and permits little decrease in detection accuracy due to the above-mentioned drift and an undesirable S/N ratio. Furthermore, since a comparison reference $V_N$ with respect to $V_p$ varies in the same direction, the distribution of characteristics of a light receiving element is not adversely affected.

Figure 6:
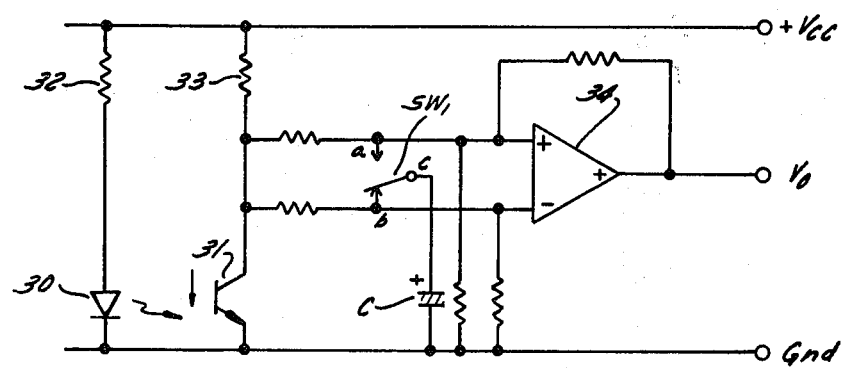
FIG. 6 is a circuit diagram of another embodiment of the present invention.

FIG. 6 shows another embodiment of the present invention. In this embodiment, an integration circuit consisting of a level setting voltage dividing resistor and a capacitor C is provided as a delay circuit, and the detection of the front and rear ends of an original is interchangeably conducted by inserting the delay circuit in a different position by means of a changeover means or switch $SW_1$.

The delay circuit is not limited to the above-mentioned integration circuit consisting of a capacitor C and a resistor. It may have linear characteristics in conformity with the variation characteristics of $V_C(V_p)$. In fact, an integration circuit of a simple construction meets the purpose and does not adversely affect the precision of detection except when the feed rate of an original is detected from a detected signal.

As may be clearly understood from the above, a photodetector device according to the present invention, which has a comparatively simple construction, permits detecting a moving sheet at a high precision. It also permits detecting the dimensions and feed rate of a moving sheet at a high precision.

Figure 7:
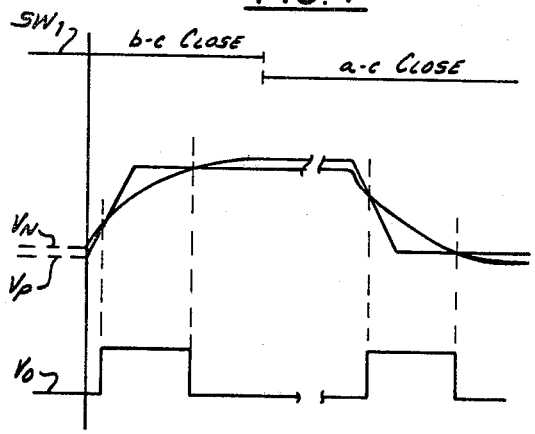
FIG. 7 is a wave form diagram describing an action of the embodiment shown in FIG. 6.

FIG. 7 shows wave forms of the circuit shown in FIG. 6. When the front end of the paper is detected while the contacts b-c are closed a pulse is generated at the output terminal Vo. After generating this pulse a relay (not shown) having contacts a, b and c is energized by a control circuit (not shown) so that contacts are changed from b-c close to a-c close. At this changing state no level difference between $V_p-V_N$ is produced. When the rear end of the paper is passed due to its moving the collector potential of transistor 31 is reduced rapidly. Accordingly, the potential at $V_N$ side is reduced following this, but the reduce of $V_p$ is delayed due to the capacity C, so that the cross points of $V_p$ and $V_N$ are produced and a pulse is generated again at the output terminal $V_o$.

Figure 8:
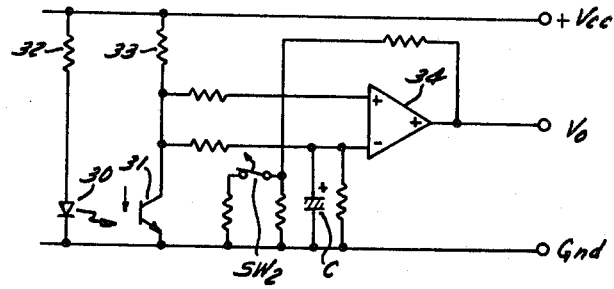
FIG. 8 is a circuit diagram of still another embodiment of the present invention in which the circuitry is generally similar to that shown in FIG. 6.

FIG. 8 discloses a photodetector device for photoelectrically detecting the presence of a moving body, comprising an operational amplifier receiving as a first input an electric signal which is in proportion to variations in the quantity of light; and a delay circuit for delaying the electric signal by a predetermined period of time and applying the electric signal to the operational amplifier as a reference input with respect to the first input, whereby the information of the presence of a moving body is obtained as an output from the operational amplifier. The photodetector device further comprises a changeover means for changing the levels of the inputs conducted to the operational amplifier such that one is higher or lower than the other to allow the detection of the front end of a moving body and the detection of the rear end of the same. The changeover means for interchanging of the levels of the inputs for the operational amplifier is actuated or operated while a moving body is passing through a position of detection to detect the front and rear ends of the moving body. When SW2 is switched by the above mentioned changeover means, the relation of $V_p<V_N$ at the steady state is reversed to $V_p>V_N$.

Reference symbols R1–R6 are attached to the resistors shown in FIG. 8 as shown in the attached drawings. The values of such resistors R1–R6 are so determined that when SW2 is ON the relation of $V_p<V_N$ is obtained at steady state, but when SW2 is OFF the relation of $V_p>V_N$ is obtained at steady state.

Figure 9:
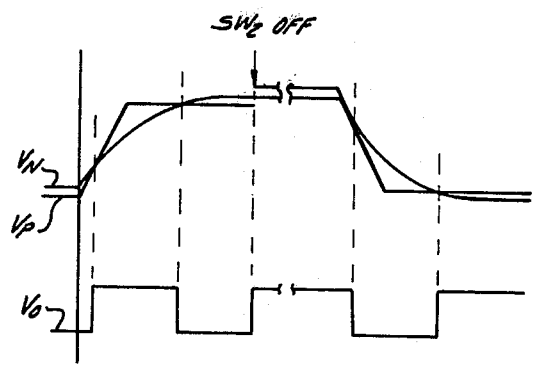
FIG. 9 is a wave form diagram describing the action of the embodiment shown in FIG. 8.

FIG. 9 shows wave forms generated from the circuit shown in FIG. 8. When the front end is detected while SW2 is ON, a pulse is generated at the output terminal $V_o$. After generating the pulse SW2 is switched to OPEN by energizing a relay, for example, by the control circuit (not shown). By this switching the relation of $V_p < V_N$ is reversed to $V_p > V_N$. When the rear end is detected in the state of $V_p > V_N$, the collector potential of transistor 31 is reduced rapidly. Accordingly, the potential at $V_p$ side is reducing following thereto, but the potential at $V_N$ side reduces with a time delay due to the capacity, so that cross points of $V_p$ and $V_N$ are produced as shown in the drawing and a pulse is generated again at the output terminal $V_o$. After detecting the rear end SW2 is switched to ON in order to detect the front end again.

Figure 10:
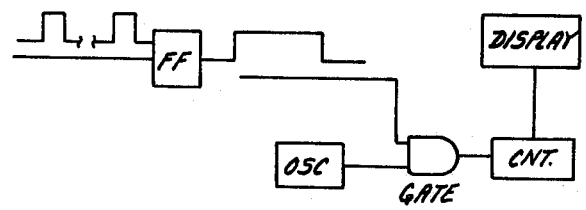
FIG. 10 is a schematic diagram of still another embodiment of the invention.

FIG. 10 shows an embodiment of a photodetector device wherein the length of a moving body with respect to the direction in which the moving body is transferred is detected from a time differential between detected signals representative of the front and rear ends, respectively, of the moving body and the feed rate thereof. When an output wave form $V_o$ as shown in FIG. 7 obtained in the circuit shown in FIG. 6 is applied on FF of the positive edge trigger and the outputs of the trigger and the oscillator are applied on the AND gate, pulses, of which number is in proportion to the length between the front end and the rear end of the moving body are generated as an output of the AND gate. A counter CNT and a display DISPLAY in FIG. 10 are for counting and displaying said pulses.

Figure 11:
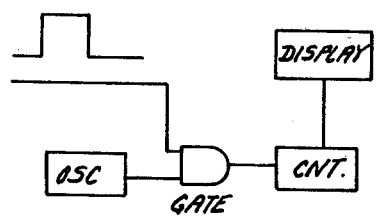
FIG. 11 is a schematic diagram of yet another embodiment of the invention.

FIG. 11 shows an embodiment of a photodetector device wherein the feed rate of a moving body is detected from the pulse width of a detected signal representative of the front or rear end of the moving body. When an output wave form $V_o$ as shown in FIG. 7 obtained in the circuit shown in FIG. 6 and an output of the oscillator OSC are applied on the AND gate, pulses, of which number is in proportion to the pulse width thereof are obtained while the front end detecting pulse or the rear end detecting pulse is generated. A counter CNT and a display DISPLAY in FIG. 11 are for counting and displaying said pulses.

Figure 12:
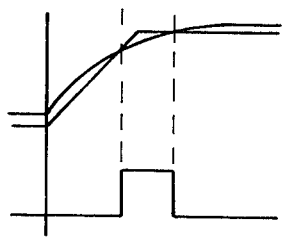
FIGS. 12 and 13 are wave form diagrams describing actions of the embodiment shown in FIG. 11.
Figure 13:
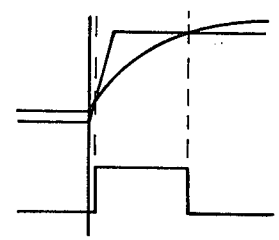
Figure 14:
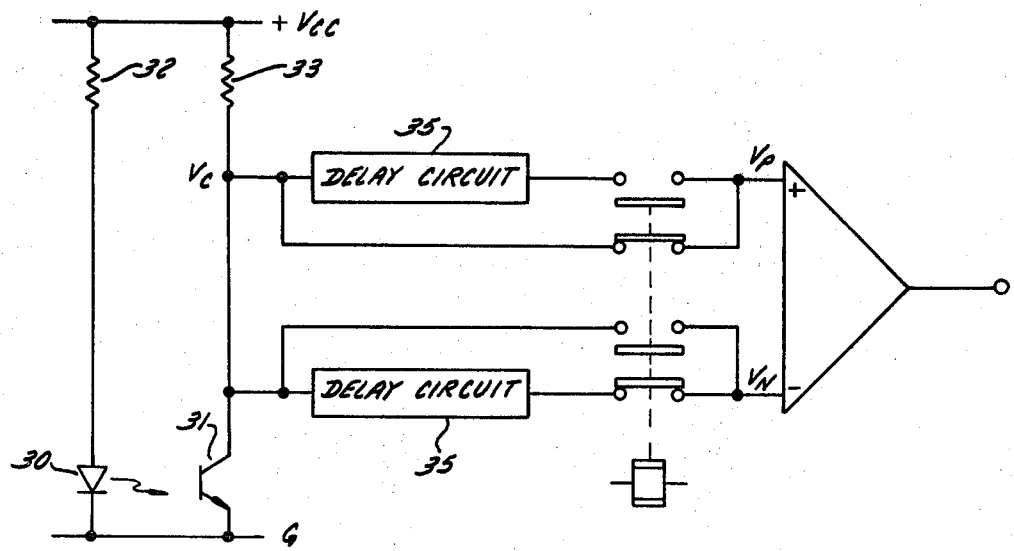
FIG. 14 is a circuit diagram, similar to that shown in FIG. 6 of another embodiment of the invention.

FIG. 12 and FIG. 13 show wave forms of $V_o$, $V_p$ and $V_N$ for explaining an embodiment of FIG. 11. In case that the moving speed of the moving body is low, the rising slope of $V_p$ is moderate so that $V_N$ follows thereto. Accordingly, at the reversing time of $V_p$ and $V_N$ the pulse width of the front end detecting pulse becomes small as shown in FIG. 12. Further, because the rising slope of $V_p$ becomes sharp in case that the moving speed of the body is large, $V_N$ does not follow so that the pulse width of the front end detecting pulse becomes large as shown in FIG. 12 at the reversing time of $V_p$ and $V_N$. The above explanation can also be applied with respect to the pulse width of the rear end detecting pulse. FIG. 14 is another circuit having a similar function as that of FIG. 6.

The present invention is not, of course, limited to the above embodiments; it may be modified in various ways within the scope of the appended claims.

What is claimed is:

1. A photodetector device for photoelectrically detecting the presence of a moving body, comprising an operational amplifier receiving as a first input an electric signal which is in proportion to variations in the quantity of light; a delay circuit for delaying the electric signal by a predetermined period of time and changeover means for applying the delayed electric signal to the operational amplifier as a reference input with respect to the first input, said changeover means for detection of the front and rear ends of the moving body in sequence, whereby the information of the presence of the moving body is obtained as an output from the operational amplifier.

2. A photodetector device according to claim 1 wherein the changeover means is for changing the levels of the inputs conducted to the operational amplifier such that one input is different than the other to allow the detection of the front end of a moving body and the detection of the rear end of the same.

3. A photodetector device according to claim 2 including means for actuating the changeover means for interchanging of the levels of the inputs for the operational amplifier while a moving body is passing through a position of detection to detect the front and rear ends of the moving body.

4. A photodetector device according to claim 2 or 3 including means for detecting the length of a moving body with respect to the direction in which the moving body is transferred from a time differential between detected signals representative of the front and rear ends, respectively, of the moving body and the feed rate thereof.

5. A photodetector device according to claim 2 or 3 including means for detecting the feed rate of a moving body from the pulse width of a detected signal representative of the front or rear end of the moving body.

6. A photodetector device according to claim 1 wherein the changeover means is for inserting the delay circuit to different inputs of the operational amplifier.

* * * * *